UNITED STATES PATENT OFFICE.

FELIPE BARRIOS, OF BEJUCAL, CUBA.

COMPOSITION FOR REMOVING INCRUSTATIONS FROM BOILERS.

No. 893,894.  Specification of Letters Patent.  Patented July 21, 1908.

Application filed January 21, 1908. Serial No. 411,871.

*To all whom it may concern:*

Be it known that I, FELIPE BARRIOS, citizen of Cuba, residing at 96 Ninth street, Bejucal, Cuba, have invented new and useful Improvements in Composition of Matter for Cleaning and Removing the Incrustations from Boilers, of which the following is a specification.

My composition consists of the following ingredients, combined in the proportions stated, viz:—water, *quantum sufficit*, about 5 gallons, bark of the mangrove tree, (*Rhizophora mangle*) 80 pounds leaves of the guava tree, (*Psidium guaiva*) 17 pounds, roots of the soap tree, (*Lapindus saponaria*) 3 pounds. These ingredients, except the water, are well dried, pulverized and mixed. The water is then added and the mixture boiled for about ten minutes; it is then allowed to cool, and is again dried out, preferably by placing the mixture in an oven, and is again pulverized, the result being a dark red powder.

In using the above composition it is placed in the boiler in the proportion of about one pound of powder to each ten horse power, and this is repeated at intervals of about eight days. After three or four applications the boiler will usually be found to be thoroughly cleaned and free from incrustation. To keep the boiler clean thereafter the composition should be used about every eight days, but in only about one third the quantity.

I claim:

1. The herein-described composition of matter, consisting of water and mangrove tree bark, guava tree leaves and soap tree roots, substantially as described and for the purposes specified.

2. The herein-described composition of matter for cleaning and removing the incrustation from boilers, consisting of about five gallons of water, eighty pounds of bark of the mangrove tree, seventeen pounds of leaves of the guava tree, and three pounds of roots of the soap tree, substantially as described.

In testimony whereof I have signed my name to this specification in the presence of two subscribing witnesses.

FELIPE BARRIOS.

Witnesses:
VICTOR NORMAND,
A. ROGERS.